United States Patent
Guckenberger et al.

(10) Patent No.: US 12,487,211 B2
(45) Date of Patent: Dec. 2, 2025

(54) FERRULE SLEEVE FOR PREVENTING EXCESSIVE FERRULE DEFORMATION CAUSING LEAKS AND STUCK FERRULES

(71) Applicant: THERMO FINNIGAN LLC, San Jose, CA (US)

(72) Inventors: George B. Guckenberger, Austin, TX (US); Adam D. Bryant, Austin, TX (US)

(73) Assignee: Thermo Finnigan LLC, San Jose, CA (US)

( * ) Notice: Subject to any disclaimer, the term of this patent is extended or adjusted under 35 U.S.C. 154(b) by 264 days.

(21) Appl. No.: 18/167,995

(22) Filed: Feb. 13, 2023

(65) Prior Publication Data
US 2023/0280314 A1    Sep. 7, 2023

Related U.S. Application Data

(60) Provisional application No. 63/315,621, filed on Mar. 2, 2022.

(51) Int. Cl.
G01N 30/18    (2006.01)

(52) U.S. Cl.
CPC ....... G01N 30/18 (2013.01); *G01N 2030/185* (2013.01)

(58) Field of Classification Search
CPC .............................................. G01N 2030/185
USPC .......................................................... 285/385
See application file for complete search history.

(56) References Cited

U.S. PATENT DOCUMENTS

| | | | | |
|---|---|---|---|---|
| 4,389,313 A * | 6/1983 | Charney | ................ | B01D 15/22 96/104 |
| 4,991,883 A * | 2/1991 | Worden | ............. | G01N 30/6026 285/348 |
| 5,288,113 A * | 2/1994 | Silvis | ................. | G01N 30/6026 285/911 |
| 6,056,331 A * | 5/2000 | Benett | ..................... | F16L 19/02 285/911 |
| 8,201,854 B2 | 6/2012 | Ford et al. | | |
| 10,184,922 B2 * | 1/2019 | McCauley | ............. | G01N 30/88 |
| 2012/0169040 A1 * | 7/2012 | Barnett | .............. | G01N 30/6026 285/24 |
| 2022/0228681 A1 | 7/2022 | Tolley et al. | | |

FOREIGN PATENT DOCUMENTS

| | | | | |
|---|---|---|---|---|
| JP | H0743361 B2 * | 5/1995 | ..... | G01N 2030/6008 |
| WO | 2006078758 A1 | 7/2006 | | |
| WO | 2014007820 A1 | 1/2014 | | |

OTHER PUBLICATIONS

Hunt, M., "Which Ferrule Should I Use?", BLOGables, Jul. 17, 2018, 4 pages.*
"Ferrules and Nuts" 2016, retrieved from: http://www.supelco.com.tw/A-10-Agilent-Technologies-Instruments.pdf.
Barry et al. "Chapter 3: Capillary Column Gas Chromatography" Columns for Gas Chromatography: Performance and Selection, Aug. 7, 2006, pp. 94-209.

* cited by examiner

*Primary Examiner* — Daniel S Larkin

(57) ABSTRACT

A ferrule includes a deformable portion and a rigid sleeve surrounding at least a portion of the deformable portion. The deformable portion includes between about 5% and about 50% graphite. The deformable portion further includes between about 50% and about 95% polyimide. The rigid sleeve can include a metal, such as stainless steel.

8 Claims, 4 Drawing Sheets

FERRULE SLEEVE FOR PREVENTING EXCESSIVE FERRULE DEFORMATION CAUSING LEAKS AND STUCK FERRULES

CROSS-REFERENCE TO RELATED APPLICATIONS

This application claims the priority of U.S. Provisional Application Ser. No. 63/315,621, filed on Mar. 2, 2023, the disclosure of which is incorporated herein by reference in its entirety.

FIELD

The present disclosure generally relates to the field of gas chromatography including a ferrule sleeve for preventing excessive ferrule deformation causing leaks and stuck ferrules.

INTRODUCTION

Gas chromatography (GC) is a useful technique for analyzing volatile compounds of a sample. A GC column having a retention medium or stationary phase can be used to separate the volatile compounds based on their affinity to the retention medium. The time it takes a compound to traverse the column (retention time) is compound dependent as compounds with higher affinity for the stationary phase can be retained in the column for a longer period of time than compounds that have limited interactions with the stationary phase.

As the mobile phase is a gas (typically helium, hydrogen, or nitrogen), it is necessary to ensure gas tight connections between the column and a sampling device, such as an injector, at one end and a detector at the other end. Typically, connecting the column involves installing a ferrule onto the column, trimming the end of the column to remove any damage or contamination caused by installing the ferrule and positioning the end of the column at an optimal length for the sampling device or detector. The ferrule can be compressed and deformed to form a gas tight seal.

SUMMARY

In a first aspect, a ferrule includes a deformable portion and a rigid sleeve surrounding at least a portion of the deformable portion.

DRAWINGS

For a more complete understanding of the principles disclosed herein, and the advantages thereof, reference is now made to the following descriptions taken in conjunction with the accompanying drawings, in which.

Figure 1:
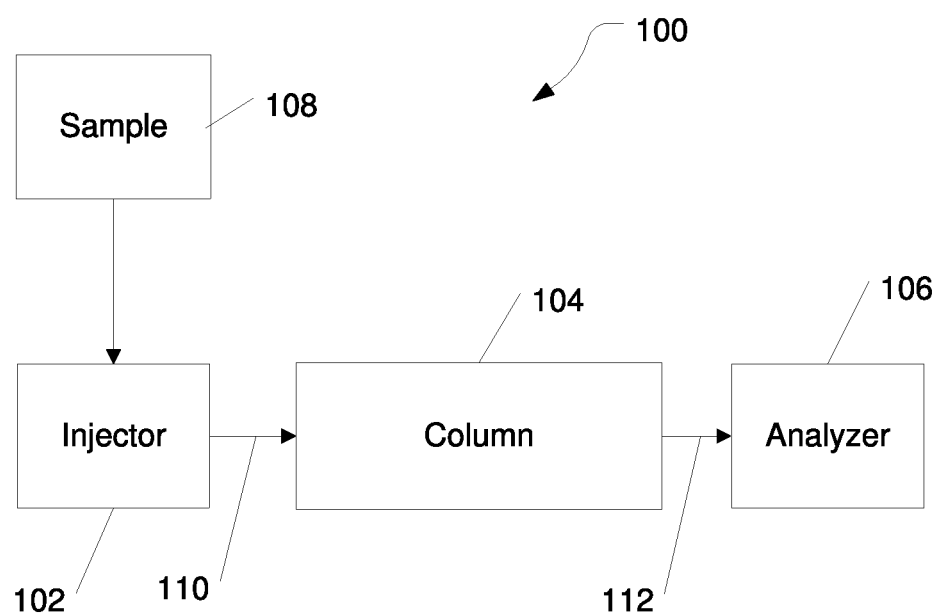
FIG. 1 is a diagram of an exemplary gas chromatography system.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DESCRIPTION OF VARIOUS EMBODIMENTS

The section headings used herein are for organizational purposes only and are not to be construed as limiting the described subject matter in any way.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless described otherwise, all technical and scientific terms used herein have a meaning as is commonly understood by one of ordinary skill in the art to which the various embodiments described herein belongs.

It will be appreciated that there is an implied "about" prior to the temperatures, concentrations, times, pressures, flow rates, cross-sectional areas, etc. discussed in the present teachings, such that slight and insubstantial deviations are within the scope of the present teachings. In this application, the use of the singular includes the plural unless specifically stated otherwise. Also, the use of "comprise", "comprises", "comprising", "contain", "contains", "containing", "include", "includes", and "including" are not intended to be limiting. It is to be understood that both the foregoing general description and the following detailed description are exemplary and explanatory only and are not restrictive of the present teachings.

As used herein, "a" or "an" also may refer to "at least one" or "one or more." Also, the use of "or" is inclusive, such that the phrase "A or B" is true when "A" is true, "B" is true, or both "A" and "B" are true. Further, unless otherwise required by context, singular terms shall include pluralities and plural terms shall include the singular.

A "system" sets forth a set of components, real or abstract, comprising a whole where each component interacts with or is related to at least one other component within the whole.

FIG. 1 illustrates a typical gas chromatograph system 100. The system includes an injector 102, a column 104, and a detector 106. A sample 108 can be supplied to the injector 102. In various embodiments, the sample 108 can be a gaseous sample, such as for head space analysis. In other embodiments, the sample 108 can be a liquid sample and the injector can vaporize the liquid sample into a gaseous state. The sample can be moved from the injector to the column 104 by a carrier gas. The column 104 includes a retention medium, typically as a thin coating on the interior surface of the column 104. The retention medium can differentially retain some compounds from the vaporized sample such that the amount of time necessary to transit the column is compound dependent. In this way, the compounds in the vaporized sample can be separated based on the time to transit the column (retention time).

Upon exiting the column 104, the compounds can enter the detector 106. Various detectors can be used as part of a GC system including flame ionization detectors, nitrogen phosphorous detectors, electron capture detectors, thermal conductivity detectors, flame photometric detectors, mass spectrometers, and the like.

The injector 102 can be coupled to the column 104 with connector 110 and column 104 can be coupled to the detector 106 by connector 112. In various embodiments, connectors 110 and 112 can be compression fittings in which a ferrule is installed onto column 104 and deformed to form a seal to prevent leaks.

Figure 4:
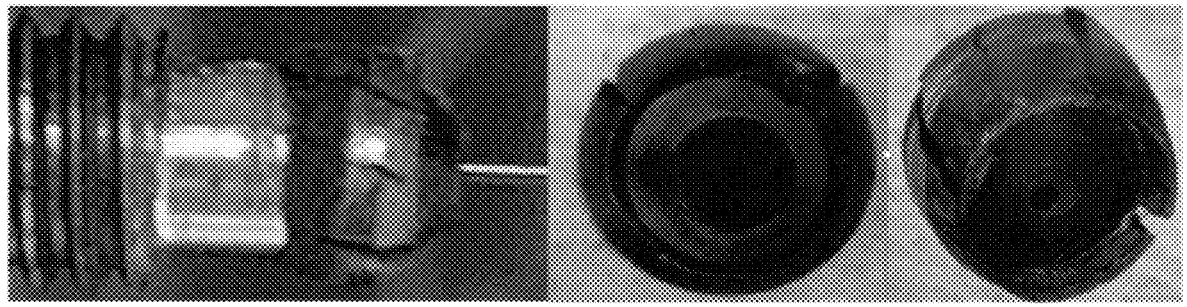
FIG. 4 is photographs showing deformation of a standard Graphite-Vespel ferrule after use in a coupling between a gas chromatograph and a mass spectrometer.

Ferrules used to seal the interface between the gas chromatograph and the mass spectrometer, such as connector 112, need to be able to form a gas tight seal and withstand thermal cycling up to temperatures in the range of 280° C. to 350° C. Graphite ferrules are capable of working at these temperatures, but they do not prevent oxygen diffusion into the vacuum of the mass spectrometer. Graphite-polyimide (Graphite-Vespel) ferrules can prevent oxygen diffusion into the vacuum of the mass spectrometer and can maintain a seal at these temperatures for short periods of time. However, deformation of the graphite-polyimide ferrules due to the high temperatures leads to a need to re-tighten the fitting in order to maintain a leak tight seal. Constraining the volume available for the ferrule to expand into can increase the time required between re-tightening of the nut. FIG. 4 shows a traditional graphite-polyimide ferrule after use. As can be seen in the photographs, the flat surface of the ferrule is compressed towards the conical surface and the graphite-polyimide is extruded laterally and backwards, leading to cracking.

Figure 5:
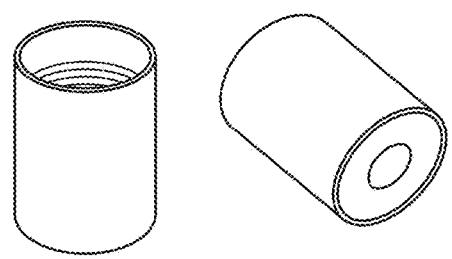
FIG. 5 is a prior art graphite ferrule in a metal cup.

FIG. 5 shows a graphite ferrule in a metal cup. The ferrule is not suitable for use in a connection between a gas chromatograph and a mass spectrometer for multiple reasons. First, the graphite does not prevent oxygen migration into the vacuum of the mass spectrometer. Additionally, the ferrule lacks a conical surface and does not form a double seal resulting in leakage of atmospheric gases into the mass spectrometer.

In various embodiments, a thread relief on the mass spectrometer interface can act like a cup to constrain the ferrules. However, such an interface would require a unique nut and would not work with inexpensive standard nuts commonly used for lower temperature work. In other embodiments, a sleeve integrated onto a ferule made of a graphite-polyimide material can allow a high temperature solution without changing the mass spectrometer hardware.

Figure 2A:
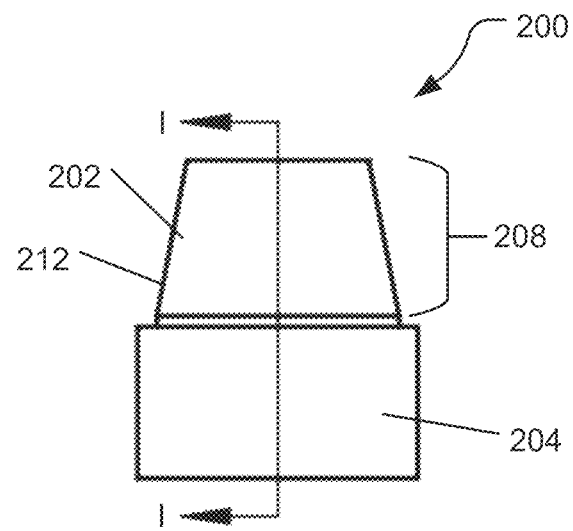
FIG. 2A is a side view of an exemplary ferrule, in accordance with various embodiments.
Figure 2B:
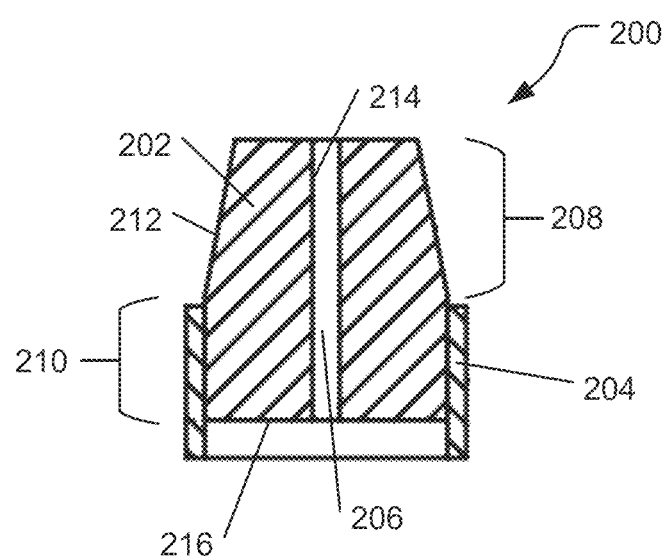
FIG. 2B is a cross-sectional view of an exemplary ferrule connector, in accordance with various embodiments.

FIG. 2A illustrates an exemplary ferrule 200 and FIG. 2B illustrates a cross-sectional view of ferrule 200 along sectional designation I-I of FIG. 2A. Ferrule 200 can include a deformable portion 202 and a rigid sleeve 204 surrounding at least a portion of the deformable portion 202.

In various embodiments, deformable portion 202 can include a central bore 206 in which a hollow tube, such as a capillary column or a transfer line, can be inserted. Additionally, the deformable portion can include a tapered region 208 and a cylindrical region 210. In various embodiments, when compressed in a fitting, the deformable portion can form a gas-tight seal between the inner surface 214 of the central bore 206 and the hollow tube. Additionally, a gas-tight seal can be formed between an outer surface of the deformable portion 208, such as outer surface 212 or outer surface 216, and the fitting.

In various embodiments, deformable portion 202 can include between about 5% and about 50% graphite, such as between about 10% and 20% graphite. The deformable portion can further include between about 50% and about 95% polyimide, such as between about 80% and about 90% polyimide.

In various embodiments, rigid sleeve 204 can surround at least a portion of the cylindrical region 210 of the deformable portion 202. Additionally, the rigid sleeve 204 can extend beyond the deformable portion 202.

In various embodiments, rigid sleeve 204 can include a metal, such as a stainless steel.

Figure 3:
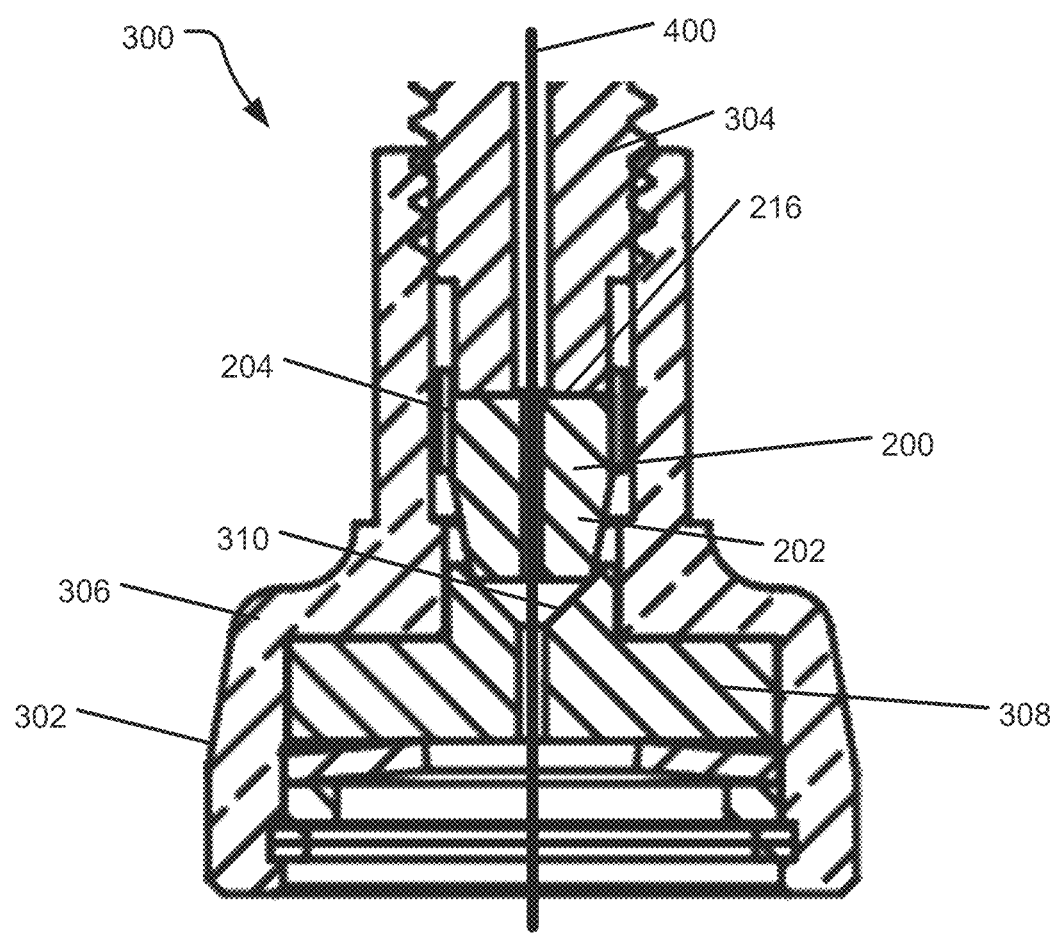
FIG. 3 is a cross-sectional view of an exemplary column connector, in accordance with various embodiments.

FIG. 3 illustrates an embodiment of a connector 300 using ferrule 200. The connector 300 includes a nut portion 302 and a mass spectrometer entrance portion 304. Ferrule 200 can be positioned between the nut portion 302 and the mass spectrometer entrance portion 304 and column 400 can be inserted through the mass spectrometer entrance portion 304, the ferrule 200, and the nut portion 302. The mass spectrometer entrance portion 304 can threadingly engage with the nut body 302.

The nut portion 302 can include a body 306 and a ferrule sealing washer 308. The ferrule sealing washer 308 can be positioned within the body 306. The ferrule sealing washer 308 can include a ferrule receiving conical surface 310.

When the nut portion 302 and the mass spectrometer entrance portion 304 are engaged, ferrule 200 can be compressed between the mass spectrometer entrance portion 304 and the ferrule sealing washer 308. The outer surface 212 of the tapered region 208 of the deformable portion 202 of the ferrule 200 can physically contact the ferrule receiving conical surface 310 while the outer surface 216 can physically contact the mass spectrometer entrance portion 304. Tightening of the threaded engagement between the mass spectrometer entrance portion 304 and the nut portion 302 can compress ferrule 200 and can deform the deformable portion 202. The deformation can form a gas-tight seal between the ferrule 200 and the column 400 and also between ferrule 200 and mass spectrometer entrance portion 304 at outer surface 216. In this way, a double seal is formed between the ambient atmosphere outside of the mass spectrometer and the high vacuum inside of the mass spectrometer. Rigid sleeve 204 can limit expansion of the cylindrical region 210, limiting the creep associated with the heating and cooling cycles and extend the life of the ferrule.

In the embodiment of FIG. 3, the interface between the tapered region 208 and the ferrule receiving conical surface 310 does not form a critical gas-tight seal as both sides of the interface are ambient atmosphere. However, in an alternate embodiment where the fitting is arranged such that the ferrule 200 is oriented with the tapered portion 202 toward the mass spectrometer, a seal between the outer surface 212 of the tapered region 208 and a ferrule receiving conical surface can form a critical gas-tight seal between the ferrule and the fitting.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A ferrule, comprising:
    a deformable portion comprising between 5% and 50% graphite and between 50% and 95% polyimide; and
    a integrated ferrule sleeve surrounding at least a portion of the deformable portion.

2. The ferrule of claim 1, wherein the integrated ferrule sleeve is a metal sleeve.

3. The ferrule of claim 2, wherein the sleeve metal includes stainless steel.

4. The ferrule of claim 1, wherein the deformable portion includes between 10% and 20% graphite.

5. The ferrule of claim 1, wherein the deformable portion includes between 80% and 90% polyimide.

6. The ferrule of claim 1, wherein the deformable portion includes a tapered region and a cylindrical region.

7. The ferrule of claim 6, wherein the integrated ferrule sleeve surrounds at least a portion of the cylindrical region of the deformable portion.

8. The ferrule of claim 1, wherein the integrated ferrule sleeve extends beyond the deformable portion.

* * * * *

UNITED STATES PATENT AND TRADEMARK OFFICE
CERTIFICATE OF CORRECTION

| | | |
|---|---|---|
| PATENT NO. | : 12,487,211 B2 | Page 1 of 1 |
| APPLICATION NO. | : 18/167995 | |
| DATED | : December 2, 2025 | |
| INVENTOR(S) | : George B. Guckenberger and Adam D. Bryant | |

It is certified that error appears in the above-identified patent and that said Letters Patent is hereby corrected as shown below:

In the Claims

In Column 6, Claim 3, Line 5, delete "sleeve metal" and insert -- metal sleeve --, therefor.

Signed and Sealed this
Tenth Day of February, 2026

John A. Squires
*Director of the United States Patent and Trademark Office*